(12) United States Patent
Boic

(10) Patent No.: US 8,074,286 B2
(45) Date of Patent: Dec. 6, 2011

(54) SECURE MEDIA PATH SYSTEM AND METHOD

(75) Inventor: Milko Boic, Sammamish, WA (US)

(73) Assignee: RealNetworks, Inc., Seattle, WA (US)

( * ) Notice: Subject to any disclaimer, the term of this patent is extended or adjusted under 35 U.S.C. 154(b) by 135 days.

(21) Appl. No.: 12/560,287

(22) Filed: Sep. 15, 2009

(65) Prior Publication Data

US 2010/0071071 A1    Mar. 18, 2010

Related U.S. Application Data

(60) Provisional application No. 61/097,201, filed on Sep. 15, 2008.

(51) Int. Cl.
| | |
|---|---|
| G06F 21/00 | (2006.01) |
| G06F 21/02 | (2006.01) |
| G06F 21/24 | (2006.01) |
| G06F 3/06 | (2006.01) |
| G11B 20/10 | (2006.01) |
| G06F 12/14 | (2006.01) |

(52) U.S. Cl. ............ 726/27; 380/201; 705/57; 726/26
(58) Field of Classification Search .................. 380/201; 726/26

See application file for complete search history.

(56) References Cited

U.S. PATENT DOCUMENTS

| | | | | |
|---|---|---|---|---|
| 6,885,748 B1* | 4/2005 | Wang | | 380/201 |
| 6,959,090 B1* | 10/2005 | Alve et al. | | 380/277 |
| 6,963,972 B1* | 11/2005 | Chang et al. | | 713/153 |
| 7,251,328 B2* | 7/2007 | Diamand et al. | | 380/205 |
| 7,353,209 B1* | 4/2008 | Peinado et al. | | 705/59 |
| 7,702,101 B2* | 4/2010 | Malcolm et al. | | 380/37 |
| 2002/0007357 A1* | 1/2002 | Wong et al. | | 707/1 |
| 2002/0012432 A1* | 1/2002 | England et al. | | 380/231 |
| 2003/0126086 A1 | 7/2003 | Safadi | | |
| 2004/0088557 A1* | 5/2004 | Malcolm et al. | | 713/193 |
| 2004/0107356 A1* | 6/2004 | Shamoon et al. | | 713/193 |
| 2005/0123135 A1* | 6/2005 | Hunt et al. | | 380/200 |
| 2005/0149861 A1* | 7/2005 | Bishop et al. | | 715/515 |
| 2007/0118769 A1* | 5/2007 | England et al. | | 713/193 |
| 2008/0037780 A1* | 2/2008 | Layton | | 380/201 |
| 2008/0063196 A1* | 3/2008 | Evans et al. | | 380/200 |
| 2009/0228450 A1* | 9/2009 | Zhang | | 707/3 |

* cited by examiner

*Primary Examiner* — Jung Kim
*Assistant Examiner* — Theodore Parsons
(74) *Attorney, Agent, or Firm* — Æon Law; Adam L.K. Philipp

(57) ABSTRACT

Many media playback devices have a secure environment, with media decrypter and decoder components, and an insecure environment, with intermediate media processing components that are not suitable for secure implementation. In the secure environment, secure components decrypt encrypted media and store the clear-form media in secure memory that can only be accessed by secure components. Secure components also generate a media-data "proxy", which corresponds structurally to the clear-form media, but which does not include actual clear-form media data. The media-data proxy is provided to insecure intermediate components, which manipulate the proxy to perform operations such as de-multiplexing, loss mitigation, and coded frame assembly. The manipulated proxy is returned to the secure environment, where secure components identify structural changes that were made to the proxy and make corresponding structural changes to the clear-form media before decoding the manipulated clear-form media.

22 Claims, 8 Drawing Sheets

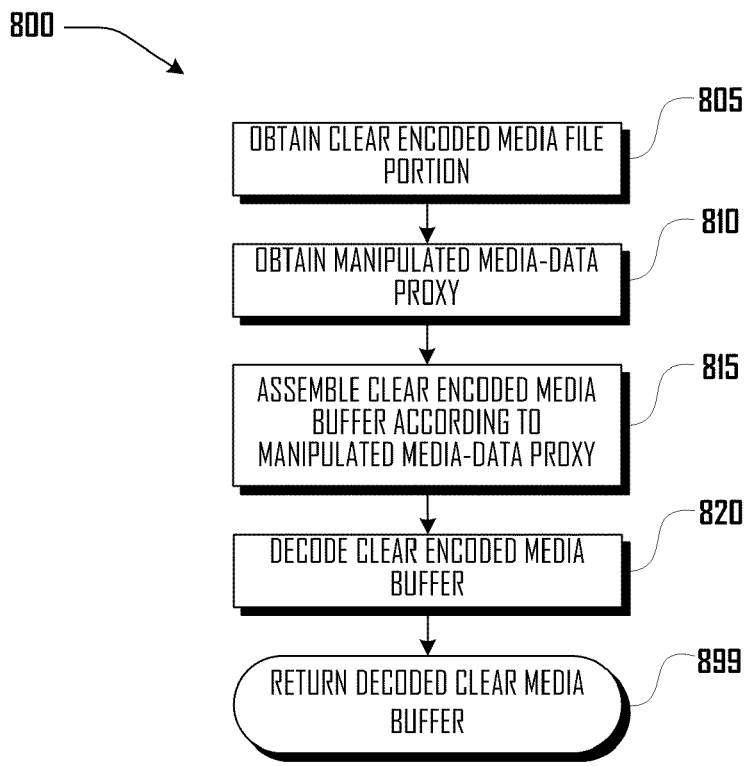

US 8,074,286 B2

SECURE MEDIA PATH SYSTEM AND METHOD

CROSS REFERENCE TO RELATED APPLICATIONS

This application claims the benefit of priority to U.S. Provisional Application No. 61/097,201, filed Sep. 15, 2008, titled "MEDIA PATH PROTECTION VIA MASKED RAM SYSTEM AND METHOD," naming inventor Milko Boic. The above-cited application is incorporated herein by reference in its entirety, for all purposes.

FIELD

The present disclosure relates generally to digital media, and more particularly, to a system and method for securely processing rights-managed media via a masked media proxy.

BACKGROUND

Media play devices have enjoyed increasing popularity in recent years. Media play devices may include handheld computers, wireless telephones, portable media players, personal digital assistants ("PDAs"), and the like. Over time, media playback devices have acquired increasing functionality, and many such devices now provide their users with rich experiences not possible just a few years ago.

The advent of digital media and analog/digital conversion technologies, especially those that are usable on mass-market general-purpose personal computers, has vastly increased the concerns of copyright-dependent organizations, especially within the music and movie industries. While analog media inevitably loses quality with each copy generation, and in some cases even during normal use, digital media files may often be duplicated with no degradation in the quality of subsequent copies. The advent of personal computers as household appliances has made it convenient for consumers to convert media (which may or may not be copyrighted) originally in a physical/analog form or a broadcast form into a universal, digital form for location-shifting and/or time-shifting. The ease with which digital media may be obtained and copied, combined with increased use of the Internet and popular file sharing tools, has made unauthorized distribution of copies of copyrighted digital media (so-called digital piracy) increasingly common.

BRIEF DESCRIPTION OF THE DRAWINGS

FIG. 8 is a flow diagram illustrating a clear media file portion manipulation subroutine in accordance with one embodiment.

DESCRIPTION

Figure 1:
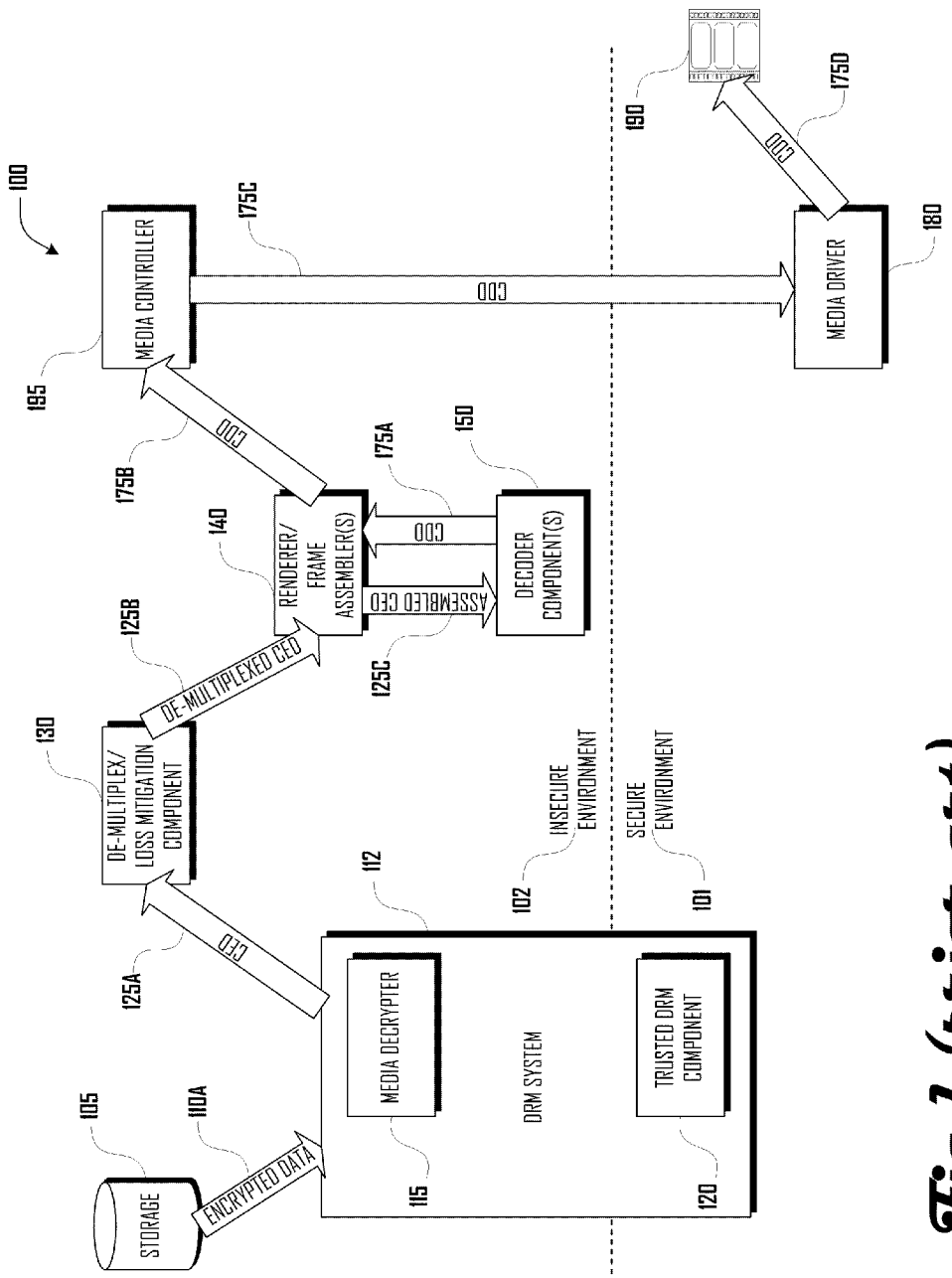
FIG. 1 is a system diagram showing a number of components in a media path as per existing technology.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Digital rights management ("DRM") technologies attempt to control use of digital media by preventing access, copying or conversion to other formats by end users. As illustrated in FIG. 1, existing DRM media paths 100 may be implemented in various devices such that media data requires protection after it has been decrypted. An existing DRM system 112 may have a trusted component 120 that operates in a secure environment 101 and one or more media decrypters 115, media plugins (not shown), and/or file plugins (not shown) that may operate in an insecure environment 102. However, in many cases, clear (decrypted) encoded media data ("CED") 125 is processed by insecure components 130, 140 prior to be being handed to decoder component(s) 150 for decoding. It is during this phase, between a decrypter 115 and a decoder 150, that encoded data in clear 125A-B may be most vulnerable and most valuable (as it is in clear and still encoded, meaning that it may be captured and redirected without having to be re-encoded). As a result, if a client system is compromised, decrypted data 125 may be copied, often without any loss in quality. Typically, between a decrypter 115 and a decoder 150, one or more intermediate processing components 130, 140 may need to manipulate the media data. Such intermediate processing components often include a de-multiplexing and/or loss mitigation component 130 and a renderer and/or coded frame assembler component 150. For example, component 130 may de-multiplex CED 125 into separate streams of audio and video and/or perform loss mitigation on the CED 125 stream.

After decoder component(s) 150 decode CED 125 into clear (decrypted) de-coded media data ("CDD") 175, a media controller 195 may provide play/pause/stop/seek controls, volume controls, and the like, before media driver 180 renders the CDD 175D to an audio and/or video 190 output.

In many software-based DRM schemes, CED 125 passed through the components between decrypter 115 and decoder 150 may be protected by obfuscation (e.g., scrambled and/or protected by a cryptographically insecure key). In other systems, components 130, 140 may be verified for authenticity by signature checking or similar methods. For example, trusted DRM component 120 could verify media decrypter 115, which could verify de-multiplex/loss mitigation component 130, and so on, creating a chain of trust. In addition, anti-debugging techniques may be applied to prevent debugger attacks. While such methods may improve the security of protected media content, these types of techniques also increase CPU power requirements, overall framework complexity, and thus cost. Moreover, even with such improvements, DRM systems are typically not fail-proof, as CED CMD must be exposed in clear form in RAM at least for brief periods when insecure components 130 and/or 140 manipulate the CED CMD.

Figure 2:
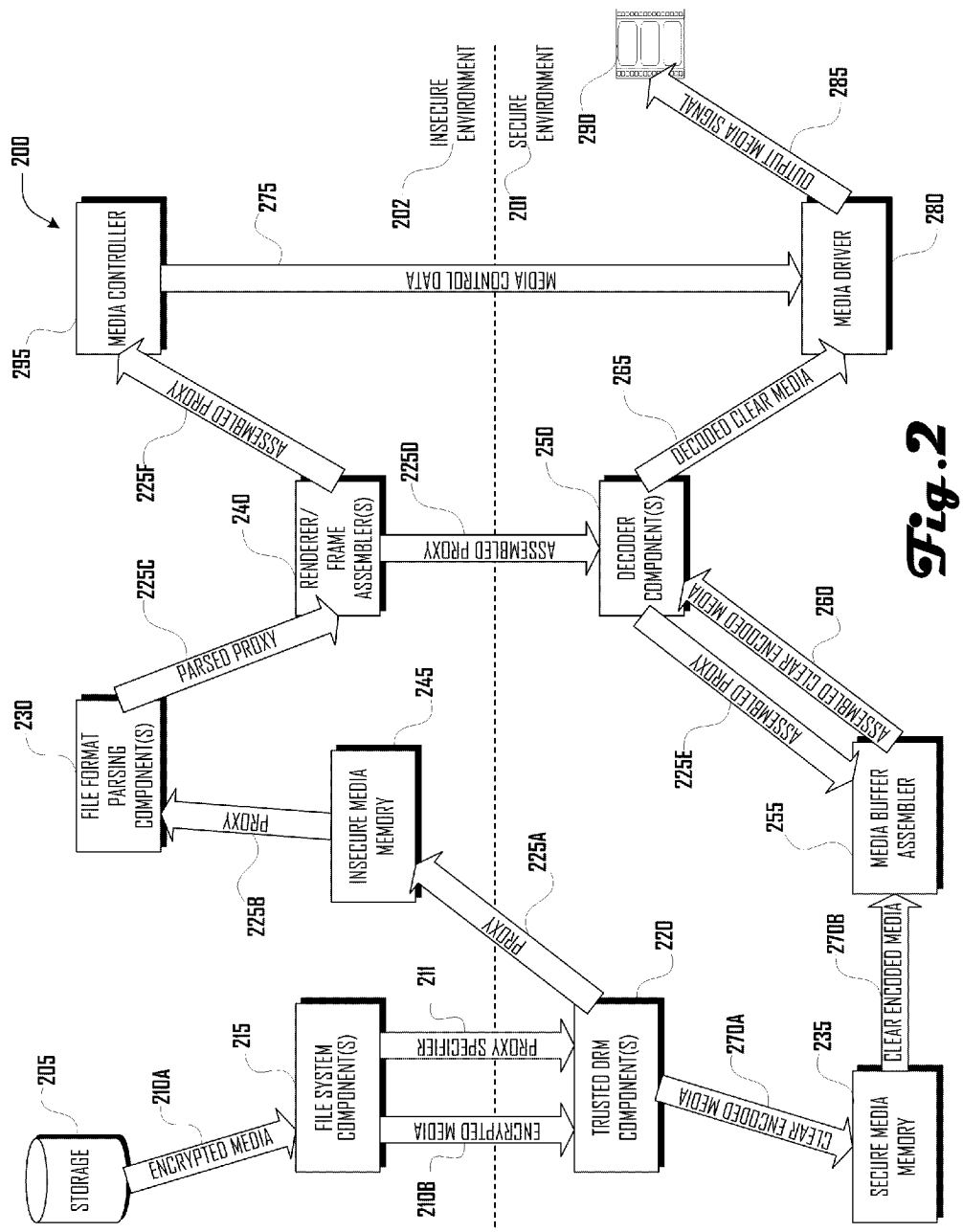
FIG. 2 is a system diagram showing a number of components in a secure media/proxy path in accordance with one embodiment.

FIG. 2 illustrates an alternate approach, in which encoded data in clear form 270 remains in the secure environment 201 until it is decoded or even until it is rendered and/or displayed on an output device 290 (e.g., screen, speaker, and the like). Trusted video and/or audio decoders 250 may be made available in secure environment 201. In one embodiment, trusted video and/or audio decoders 250 may be placed in a play device's firmware. Since video and audio decoder components are commonly made available in firmware, they can in some environments be leveraged to run off the main processor on hardware with special access privileges to secured RAM 235 that components 215, 230, 240 in insecure environment 202 cannot read. Having trusted video and/or audio decoders 250 in secure environment 201 opens an opportunity to move at least some of the media processing chain into the secure environment 201.

However, taking advantage of such an opportunity also requires addressing other operations that may not be suitable for implementation in secure environment 201 (e.g., de-multiplexing, loss mitigation, frame assembly, and the like). Typically, components that perform de-multiplexing, loss mitigation, and/or frame assembly (e.g. 230, 240) may be tightly integrated into the media framework, and moving them into firmware and/or granting them access to secure environment 201 may be difficult to manage from a flexibility and/or security perspective. Moreover, to provide comprehensive coverage of various media formats, there may be numerous individual instances of file format parsing component(s) 230 and frame assembly/renderer component(s) 240, and some or all of these instances may require relatively frequent maintenance in order to maintain interoperability with a large number of media formats.

Thus, from a practical standpoint, many components (e.g., de-multiplexing/loss mitigation component(s) 230 and frame assembly/renderer component(s) 240, and the like) may be readily implemented in an insecure (but easily updatable) environment 202. However, it is challenging to ensure that these insecure components 215, 230, 240 are able to operate on media data stored within the secure environment.

In one embodiment, insecure components 215, 230, 240 are able to perform operations such as de-multiplexing, loss mitigation, and coded frame assembly without exposing decrypted media data outside of the secure environment 201. In one embodiment, this feat may be accomplished by taking advantage of the fact that insecure components 215, 230, 240 may require only media data header data and/or metadata 315-318 (see FIG. 3, discussed below), not actual media data 320-323 (see FIG. 3, discussed below), to perform their respective operations. In other words, many such insecure components 215, 230, 240 do not need access to media data proper 320-323, but only access to header data and/or metadata 315-318 that describes the structure of the media data proper 320-323. For example, frame assembly/renderer component(s) 240 may merely re-arrange blocks of the media data proper 320-323, or possibly insert synthesized data, but not make any additional changes to the media data proper 320-323. As a result, in one embodiment, the header data and/or metadata 315-318 needed by insecure components 215, 230, 240 may be exposed, while media data 320-323 within a media container 270 remains "masked" behind a media-data "proxy" 225.

Figure 3:
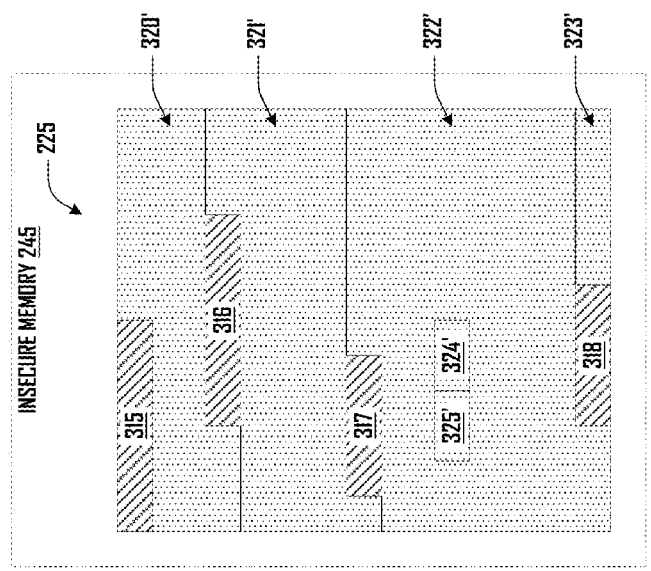
FIG. 3 is a diagram illustrating a portion of a media file and a corresponding media-data proxy in accordance with one embodiment.
Figure 3:
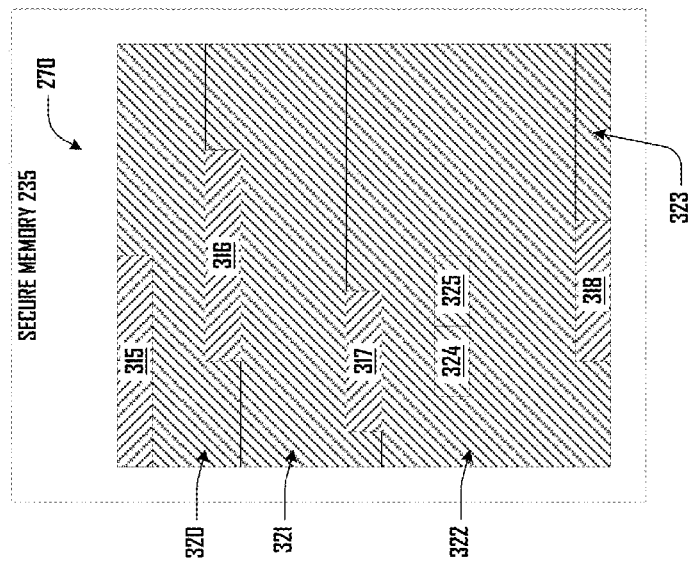

An exemplary media-data proxy 225 is illustrated in FIG. 3. A clear (decrypted) media file portion 270 includes one or more header and/or metadata portions 315-318 and one or more portions 320-323 of media data proper, each of which may include one or more identifiable blocks 324-325 of media data. In one embodiment, clear media file portion 270 is stored in secure memory 235, accessible only via secure environment 201. A corresponding media-data proxy 225 includes one or more header and/or metadata portions 315-318, just as in the clear media file portion 270. However, portions 320'-323' do not include media data proper. Rather, media-data proxy 225 portions 320'-323' comprise non-media-data that references media-data-proper portions 320-323.

Initially, the data portions 320'-323' surrounding the copied header portions 315-318 in the media-data proxy 225 may be marked as unreadable. Thereafter, the unreadable data portions 320'-323' may be replaced with references (e.g., pointers) to sensitive media portions 320-323, which remain stored in secure memory 235. In one embodiment, the media-data proxy 225 may be treated as a file block, meaning that processes can seek and move blocks (e.g., 324' and 325') within it. However, insecure components 215, 230, 240 cannot access the sensitive media data portions 320-323 stored in secure memory 235. Insecure components 215, 230, 240 may be able to access only the non-sensitive header portions 315-318.

Thus, as illustrated in FIG. 3, the structure of media-data proxy 225 corresponds to the structure of clear media file portion 270. However, the substance of media-data proxy 225 does not correspond to the substance of clear media file portion 270. In other words, although header and/or metadata portions 315-318 correspond in clear media file portion 270 and media-data proxy 225, the substance of sensitive media data portions 320-323 does not correspond to the substance of referential, non-media-data portions 320'-323'.

Referring again to FIG. 2, an illustrative media path in an exemplary play device may in one embodiment proceed as follows. Encrypted encoded media 210A is obtained from storage 205 by file system component(s) 215. In some embodiments, encrypted encoded media 210A may be obtained via a network interface or other media-data source. In one embodiment, file system component(s) 215 may comprise one or more plug-ins that obtain and process media data, including a File System Plug-in, a DRM File System Plug-in, a DRM Plug-in, and the like. One or more of these plug-ins may also obtain and/or validate licensing data or other permissions data. In general, at least one file system component(s) 215 is operative to determine a container format of an incoming media container 210A and determine a corresponding proxy specifier 211.

Generally speaking, a container format specifies the way data is stored (but not encoded) within a media container. For example, a simple container format may specify how different types of encoded audio are to be stored, while a more complex container format may specify how multiple audio and/or video streams, subtitles, chapter-information, and meta-data are stored and synchronized. Exemplary container formats include 3rd Generation Partnership Project file format ("3GP"), MPEG-4 Part 14 ("MP4"), RealMedia, and the like.

A proxy specifier 211 may comprise an algorithm or other data that may be used to create a media-data proxy 225 corresponding to a particular container format. In one embodiment, each container format may correspond to its own proxy specifier 211. A proxy specifier 211 for a container format may describe positions, offsets, and/or layouts of certain non-sensitive header portions (e.g., decrypted data layout information, data indexes, and the like) of a block of media data. In various embodiments, a proxy specifier 211 may comprise a white- or black-list of tag blocks that may be used to construct the media-data proxy 225.

Trusted DRM component(s) 220 receive into the secure environment 201 both encrypted media 210B and proxy specifier 211 from file system component(s) 215. Trusted DRM component(s) 220 decrypt encrypted media 210B into clear encoded media 270, which is stored in secure memory 235 that can be accessed by secure components 255, 250, 280, but not insecure components 215, 230, 240. Trusted DRM component(s) 220 also generate a media-data proxy 225 in accordance with the proxy specifier 211 and the clear encoded media 270.

Before storing the generated media-data proxy 225 in insecure memory 245, where insecure components 215, 230, 240 can access it, trusted DRM component(s) 220 validate the generated media-data proxy 225 to ensure that it does not expose sensitive media data. For example, to validate the media-data proxy 225, trusted DRM component(s) 220 may check data at particular offsets within the proxy 225 to ensure that only non-sensitive header-type data will be exposed to insecure components 215, 230, 240. Media-data proxy 225 may also be validated by comparing it with a pre-defined set of criteria for the indicated proxy specifier 211. Such a validation step may be desirable because in some embodiments, proxy specifier 211 is selected by an un-trusted process (e.g., an insecure file system component 215).

Validated media-data proxy 225A is stored in insecure memory 245, where insecure components 215, 230, 240 can operate on it as if it were clear encoded media 270. For example, once the validated media-data proxy 225 is made available to insecure components 215, 230, 240, it may be used for de-multiplexing, loss mitigation, and/or coded frame assembly operations as if clear encoded media 270 were fully available in insecure environment 202. Once the manipulated media-data proxy 225D is returned to secure environment 201 for decoding via decoder component(s) 250, a media buffer assembler component 255 can re-assemble the frames, including sensitive protected media data, to be fed into the decoder(s) 250 based on the manipulated media-data proxy 225D.

For example, as illustrated in FIG. 3, an insecure component (e.g., renderer/frame assembler component(s) 240) has operated on the media-data proxy 225, swapping blocks 325' and 324' compared to the locations of corresponding blocks 324 and 325 within clear media file portion 270. When secure media buffer assembler component 255 obtains the assembled proxy 225E, media buffer assembler 255 may in one embodiment determine that blocks 325' and 324' were re-arranged and make corresponding changes to the locations of blocks 324 and 325 within clear media file portion 270 before passing the assembled clear encoded media 260 to decoder component(s) 250. In the illustrated embodiment, decoder component(s) 250 decode the assembled clear encoded media 260 into decoded clear media 265, which media driver 280 transforms into an output media signal 285 for presentation 290 to the user. Media driver 280 may also receive control signals 275 from media controller 295, such as play/pause/stop/seek signals, volume control signals, and the like.

Figure 4:
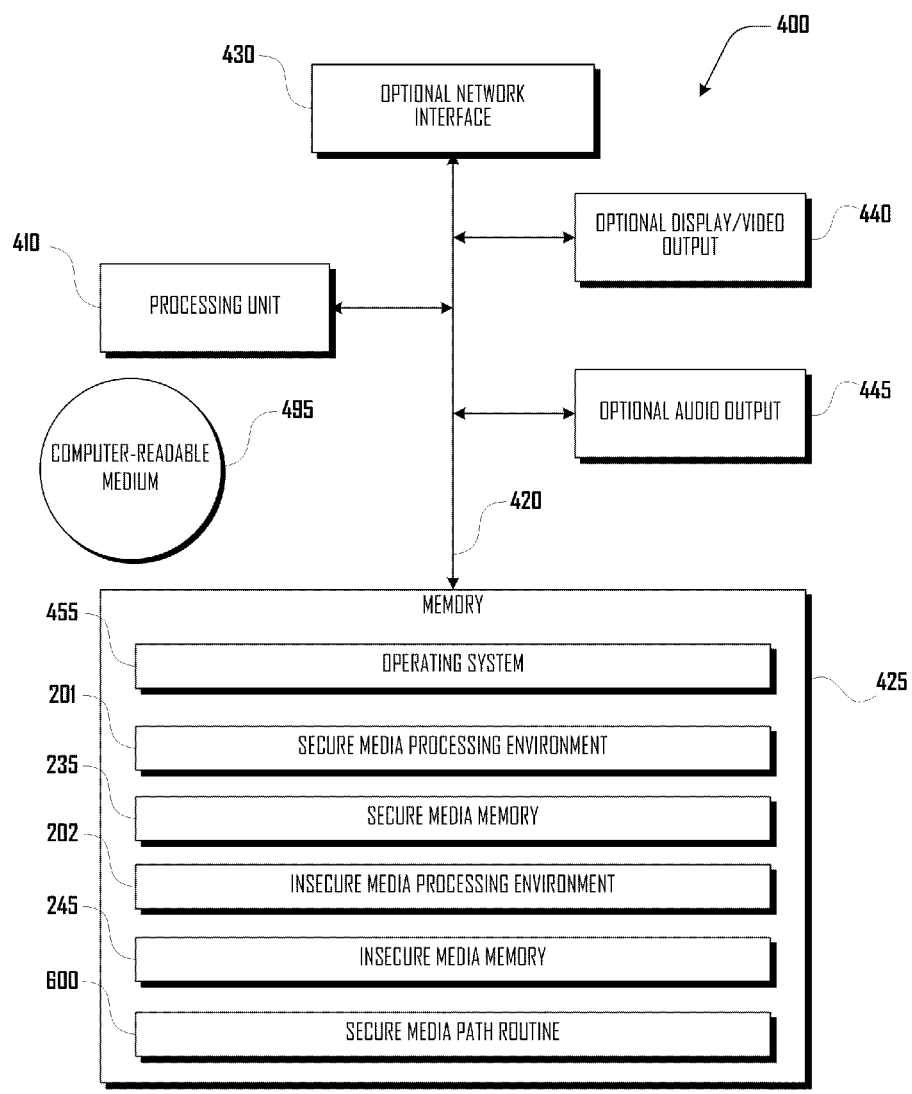
FIG. 4 is a block diagram of a media play device that provides an exemplary operating environment for various embodiments.

FIG. 4 illustrates several components of an exemplary media play device 400 such as may host an exemplary embodiment. In some embodiments, device 400 may include many more components than those shown in FIG. 4. However, an illustrative embodiment may be disclosed without showing these generally conventional components. In various embodiments, media play device 400 may be one or several types of media play devices, including desktop computers; laptop computers; phones, media players, and other mobile devices; PDAs; set-top boxes; game devices; appliances; and the like.

As shown in FIG. 4, media play device 400 includes an optional network interface 430 for connecting to a network (e.g., the Internet). If present, network interface 430 includes the necessary circuitry for such a connection and is constructed for use with an appropriate protocol.

Device 400 also includes a processing unit 410, a memory 425, an optional display or video output 440, and an audio output 445, all interconnected, along with optional network interface 430, via bus 420. Memory 425 generally comprises a random access memory ("RAM"), a read only memory ("ROM"), a firmware, and/or a persistent storage device, such as a disk drive, flash storage, removable storage card, and the like.

Memory 425 also stores a secure media processing environment 201 that can access a secure media memory 235 and an insecure media memory 245; and an insecure media processing environment 202 that can access the insecure media memory 245. As noted above, in some embodiments, some or all of secure media processing environment 201 may be implemented in media play device's firmware.

In addition, memory 425 also stores program code for some or all of a secure media path routine 600 (see FIG. 6, discussed below). Furthermore, memory 425 also stores an operating system 455. These and other software components may be loaded from a computer readable storage medium 495 into memory 425 of device 400 using a drive mechanism (not shown) associated with a computer readable storage medium 495, such as a floppy disc, tape, DVD/CD-ROM drive, memory card. In some embodiments, software components may also be loaded via the network interface 430 or other non-storage media.

Figure 5:
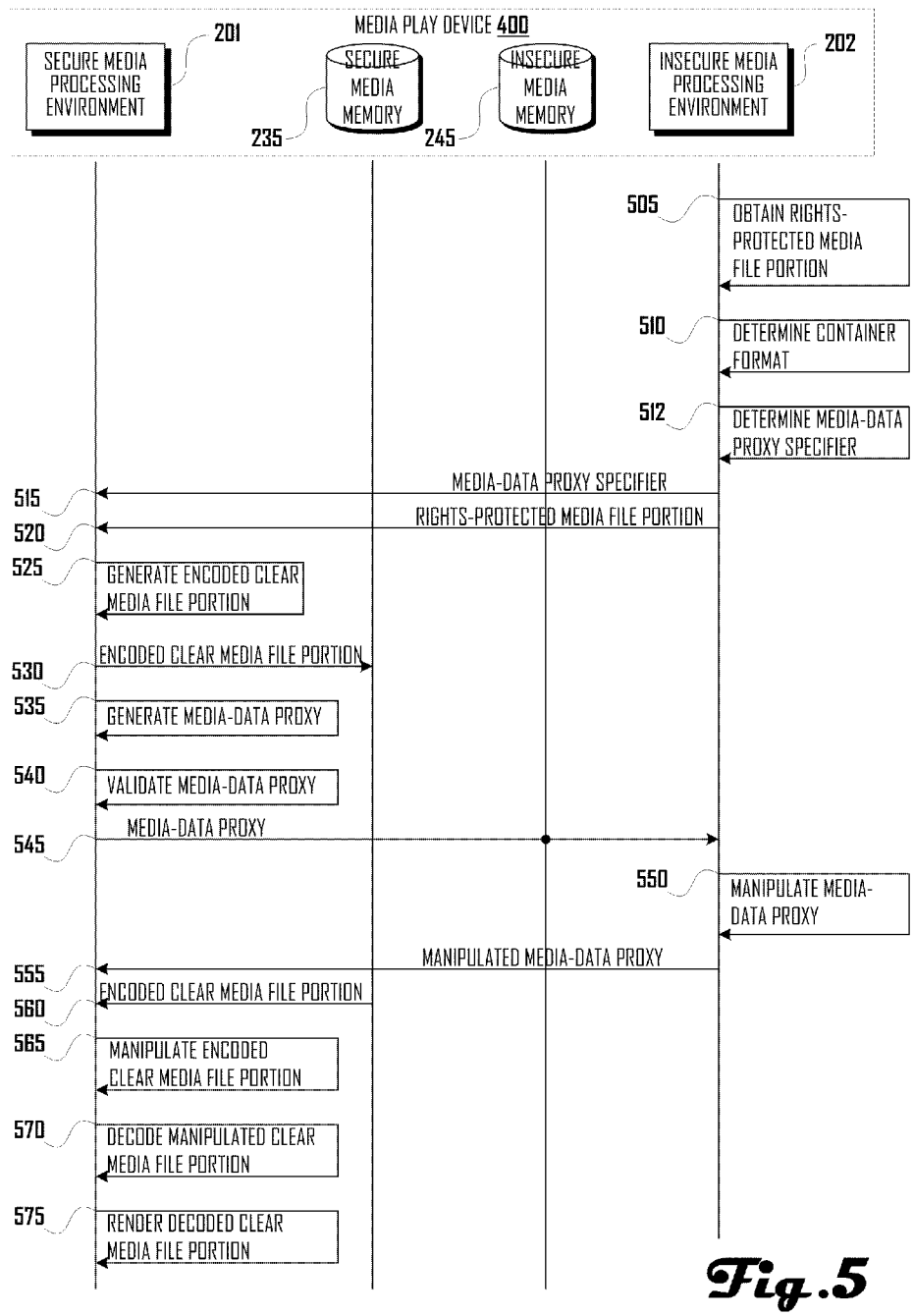
FIG. 5 is a data-flow diagram illustrating a secure media/proxy path in accordance with one embodiment.

FIG. 5 illustrates data flow within an illustrative secure media processing path. One or more components in insecure media processing environment 202 obtain 505 at least a portion of a rights-protected media file; determine 510 the file portion's container format; determine 512 a media-data proxy specifier; and send 515, 520 the media-data proxy specifier and the rights-protected media file portion to secure media processing environment 201.

Within secure media processing environment 201, one or more trusted component(s) generate 525 a clear (decrypted) encoded media file portion, which is stored 530 in secure media memory 235. Within secure media processing environment 201, one or more trusted component(s) also generate 535 and validate 540 a media-data proxy according to the media-data proxy specifier and the rights-protected media file portion. Once validated to ensure that it will not expose sensitive media to insecure media processing environment 202, the media-data proxy is sent 545 to insecure media processing environment 202 via insecure media memory 245.

Once the media-data proxy is stored in insecure media memory 245, one or more insecure media-processing components manipulate 550 the media-data proxy as if it were the clear encoded media portion. For example, in one embodiment, file format parsing component(s) 230 may de-multiplex separate audio and video streams within the proxied media-data, while frame assembly/renderer component(s) 240 converts proxied media packets into proxied media frames. Applications which are made possible by manipulation 550 of the media-data proxy and the method and apparatus disclosed herein include client-side advertisement insertion, fast forwarding and reverse frame pruning, subtitle insertion, and speech track audio audio replacement.

The manipulated media-data proxy is sent 555 back to secure media processing environment 201, where a trusted media processing component (e.g., media buffer assembler 255) retrieves 560 the encoded clear media file portion and manipulates 565 it at least in part according to manipulations that were performed on the media-data proxy in insecure media processing environment 202. In some embodiments, additional operations and/or manipulations (not shown) may perform in secure media processing environment 201. A trusted media processing component (e.g., decoder 250) decodes 570 the manipulated clear media file portion, and a trusted media processing component (e.g., media driver 280) renders 575 the decoded clear media file portion to an output device (e.g., a display screen and/or a loudspeaker).

Figure 6:
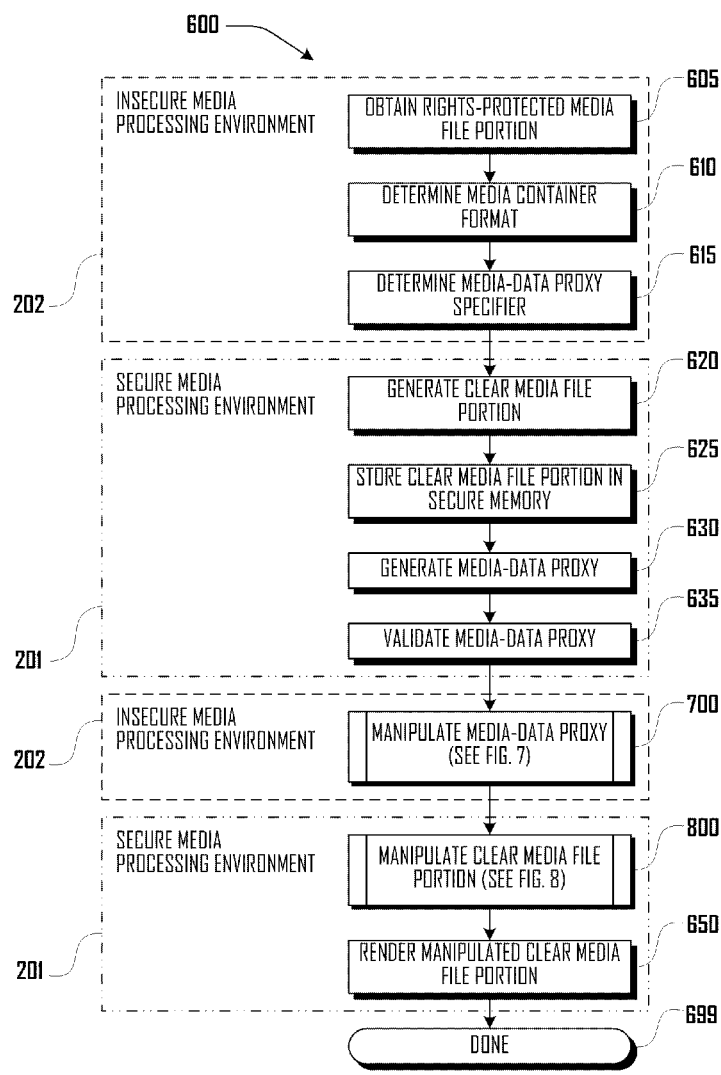
FIG. 6 is a flow diagram illustrating a secure media path routine in accordance with one embodiment.

FIG. 6 illustrates a secure media path routine 600 in accordance with one embodiment. In block 605, routine 600, executing in insecure media processing environment 202, obtains a rights-protected media file portion. In one embodiment, a rights-protected media file portion may be obtained from storage (e.g., storage 205, see FIG. 2, discussed above) by a file system component (e.g., file system component(s) 215, see FIG. 2, discussed above). In some embodiments, the rights-protected media file portion may be obtained via a network interface or other media-data source.

Still in insecure media processing environment 202, routine 600 determines in block 610 a media container format of the obtained rights-protected media file portion (e.g. 3GP, MP4, RealMedia, and the like) and in block 615, determines a corresponding media-data proxy specifier. In one embodiment, a proxy specifier for a container format may describe positions, offsets, and/or layouts of certain non-sensitive header portions (e.g., decrypted data layout information, data indexes, and the like) of a block of media data. In various embodiments, a proxy specifier may comprise a white-list or black-list of tag blocks that may be used to construct the media-data proxy.

In block 620, routine 600, now executing in secure media processing environment 201, generates a clear (decrypted, but still encoded) media file portion according to the rights-protected media file portion, and in block 625, stores the clear encoded media file portion into a secure memory (e.g., secure media memory 235), where it can be accessed only by trusted components in secure media processing environment 201. In block 630, routine 600 (still executing in secure media processing environment 201) generates a media-data proxy according to the clear encoded media file portion and the media-data proxy specifier. In one embodiment, the media-data proxy thus generated corresponds structurally, but not substantively, to the clear encoded media file portion.

Before passing the generated media-data proxy to insecure media processing environment 202, routine 600 in block 635 validates the media-data proxy to ensure that only non-sensitive data (e.g., headers and/or metadata 315-318) will be exposed to insecure media processing environment 202.

Once the media-data proxy is validated, routine 600 performs media-data proxy manipulation subroutine 700 (see FIG. 7, discussed below) in insecure media processing environment 202, manipulating the media-data proxy as if it were the clear encoded media file portion.

Returning to secure media processing environment 201 in block 800 (see FIG. 8, discussed below), routine 600 retrieves the clear encoded media file portion from secure memory and manipulates the clear encoded media file portion at least in part according to the manipulated structure of the media-data proxy. In some embodiments, additional operations and/or manipulations (not shown) may perform in secure media processing environment 201. In block 650, routine 600 (still in secure media processing environment 201) renders the manipulated clear media file portion to an output device (e.g., a display and/or a loudspeaker). Routine 600 ends at block 699.

Figure 7:
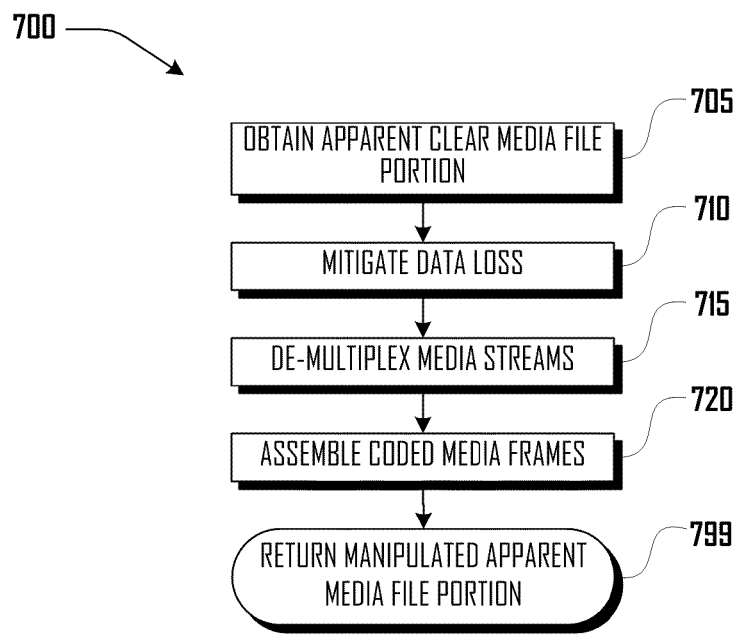
FIG. 7 is a flow diagram illustrating a media-data proxy manipulation subroutine in accordance with one embodiment.

FIG. 7 illustrates a media-data proxy manipulation subroutine 700 in accordance with one embodiment. In other embodiments, subroutine 700 may comprise more or fewer blocks than those illustrated in FIG. 7. In block 705, subroutine 700 obtains a file portion that will be treated as if it were a portion of clear (decrypted) media data (an "apparent" clear media file portion). For example, in one embodiment, subroutine 700 obtains a media-data proxy 225 from insecure media memory 245, the media-data proxy 225 structurally corresponding to a clear encoded media file portion. In such an embodiment, the media-data proxy 225 will be manipulated by subroutine 700 as if it were the clear encoded media file portion, even though the media-data proxy does not expose any sensitive media data to the components performing subroutine 700.

In block 710, subroutine 700 mitigates data loss that may be present in the apparent clear media file portion. For example, in one embodiment, a media container format may specify multiple layers of media and/or be optimized for streaming, such that the loss of a frame in transit does not cause a drop-out, but rather a temporary degradation in media quality. In block 710, subroutine 700 manipulates the "apparent" clear media file portion to account for any data loss that may have taken place.

In block 715, subroutine 700 performs a de-multiplexing manipulation on the "apparent" clear media file portion. For example, subroutine 700 may separate the apparent clear media file portion into separate streams of apparent audio and apparent video.

In block 720, subroutine 700 assembles coded media frames in the apparent clear media file portion. For example, in one embodiment, an assembler component (e.g., renderer/frame assembler(s) 240) may convert apparent media packets into apparent media frames, connecting or dividing units of apparent media into different-sized units and possibly re-arranging apparent media blocks to form complete apparent media frames.

In block 799, subroutine 700 returns the manipulated apparent media file portion to the calling routine.

FIG. 8 illustrates a manipulated clear encoded media subroutine 700 in accordance with one embodiment. In block 805, subroutine 800 obtains a clear encoded media file portion. For example, in one embodiment, subroutine 800 obtains clear encoded media file portion 270 from secure media memory 235. In block 810, subroutine 800 obtains a manipulated media-data proxy. For example, in one embodiment, subroutine 800 obtains an assembled media-data proxy 225 from decoder component(s) 250. In block 815, subroutine 800 assembles a manipulated clear encoded media buffer whose structure corresponds to the structure of the manipulated media-data proxy. For example, as illustrated in FIG. 3, if manipulated media-data proxy 225 has portion 325' positioned before portion 324', subroutine 800 may swap the positions of corresponding portions 324 and 325 in clear encoded media file portion 270.

Once subroutine 800 has manipulated the structure of the clear encoded media file portion according to the structure of the manipulated media-data proxy, in block 820, subroutine 800 decodes the manipulated clear encoded media file portion, and in block 899, subroutine 800 returns the decoded clear media buffer.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

I claim:

1. A method executing on a media playback device for securely rendering rights-protected media, the method comprising:
   obtaining a rights-protected media file portion at the media playback device, the media playback device comprising a processor for processing media in a secure media processing environment and an insecure media processing environment, wherein said secure media processing environment has access to an insecure memory and a secure memory, and wherein said insecure media processing environment has access to said insecure memory, but lacks access to said secure memory;
   performing steps a-d in said secure media processing environment:
   a. generating a clear media file portion by removing rights-protection from said rights-protected media file portion, said clear media file portion comprising a clear meta-data portion and a plurality of blocks of encoded media data arranged in a first arrangement;
   b. temporarily storing said clear media file portion in said secure memory;
   c. generating a proxy comprising i) a proxy clear-meta-data portion corresponding substantively and structurally to said clear meta-data portion and ii) a plurality of blocks of non-media data arranged according to said first arrangement such that said proxy corresponds structurally, but not substantively, to said clear media file portion; and
   d. storing said proxy in said insecure memory;
   while said clear media file portion remains temporarily stored in said secure memory, performing step e in said insecure media processing environment:
   e. accessing said proxy in said insecure memory via an intermediate processing component, said intermediate processing component re-arranging at least some of said plurality of blocks of non-media data into a second arrangement, different from said first arrangement, to form a manipulated proxy in said insecure memory, wherein said intermediate processing component lacks access to said clear media file portion, but wherein said intermediate processing component manipulates said proxy as if it were said clear media file portion; and
   after said manipulated proxy is formed in said insecure memory, performing steps f-h in said secure media processing environment:
   f. accessing said manipulated proxy in said insecure memory and determining said second arrangement of said plurality of blocks of non-media data of said manipulated proxy;
   g. accessing said clear media file portion in said secure memory and re-arranging said plurality of blocks of encoded media data into said second arrangement to form a manipulated clear media file portion that corresponds structurally to said manipulated proxy; and
   h. rendering said manipulated clear media file portion by the media playback device.

2. The method of claim 1, wherein said plurality of blocks of non-media data comprises a plurality of references to a plurality of locations within said secure memory in which said clear media file portion is temporarily stored.

3. The method of claim 1, further comprising:
   in said insecure environment:
   determining a media container format corresponding to said rights-protected media file portion;
   obtaining a media-data proxy specifier in accordance with said media container format; and
   providing said media-data proxy specifier to said secure media processing environment.

4. The method of claim 3, wherein said media-data proxy specifier comprises at least one of a white list of block tags to include in said media-data proxy and a black list of block tags to exclude from said media-data proxy.

5. The method of claim 3, further comprising ensuring that only non-sensitive data is exposed to said insecure media processing environment prior to storing said proxy in said insecure memory.

6. The method of claim 3, wherein generating said proxy in said secure media processing environment comprises generating said proxy in accordance with said media-data proxy specifier.

7. The method of claim 1, wherein re-arranging at least some of said plurality of blocks of non-media data in said insecure media processing environment comprises at least one of a de-multiplexing operation, a loss mitigation operation, and a frame assembly operation.

8. A media playback device comprising:
   a processor for processing media in an insecure media processing and a secure media processing environment;
   an insecure memory accessible via said secure media processing environment and said insecure media processing environment; and
   a secure memory accessible via said secure media processing environment, but not accessible via said insecure media processing environment;
   wherein said insecure media processing environment is configured to obtain a rights-protected media file portion;
   wherein said secure media processing environment is configured to perform steps a-d:
   a. generate a clear media file portion by removing rights-protection from said rights-protected media file portion, said clear media file portion comprising a clear meta-data portion and a plurality of blocks of encoded media data arranged in a first arrangement;
   b. temporarily store said clear media file portion in said secure memory;
   c. generate a proxy comprising i) a proxy clear-meta-data portion corresponding substantively and structurally to said clear meta-data portion and ii) a plurality of blocks of non-media data arranged according to said first arrangement such that said proxy corresponds structurally, but not substantively, to said clear media file portion; and
   d. store said proxy in said insecure memory;

wherein said insecure media processing environment is further configured to perform step e while said clear media file portion remains temporarily stored in said secure memory:
  e. accessing said proxy in said insecure memory via an intermediate processing component, said intermediate processing component re-arranging at least some of said plurality of blocks of non-media data into a second arrangement, different from said first arrangement, to form a manipulated proxy in said insecure memory, wherein said intermediate processing component lacks access to said clear media file portion, but wherein said intermediate processing component manipulates said proxy as if it were said clear media file portion; and
wherein said secure media processing environment is further configured to perform steps f-h after said manipulated proxy is formed in said insecure memory:
  f. access said manipulated proxy in said insecure memory and determining said second arrangement of said plurality of blocks of non-media data of said manipulated proxy;
  g. access said clear media file portion in said secure memory and re-arranging said plurality of blocks of encoded media data into said second arrangement to form a manipulated clear media file portion that corresponds structurally to said manipulated proxy; and
  h. render said manipulated clear media data media file portion.

9. The media playback device of claim 8, wherein said insecure environment is further configured to:
  determine a media container format corresponding to said rights-protected media file portion;
  obtain a media-data proxy specifier in accordance with said media container format; and
  provide said media-data proxy specifier to said secure media processing environment.

10. The media playback device of claim 9, wherein said secure media processing environment is further configured to ensure that only non-sensitive data is exposed to said insecure media processing environment prior to storing said proxy in said insecure memory.

11. The media playback device of claim 9, wherein said secure media processing environment is further configured to generate said media-data proxy in accordance with said media-data proxy specifier.

12. The media playback device of claim 8, wherein said insecure media processing environment is configured to perform at least one of a de-multiplexing operation, a loss mitigation operation, and a frame assembly operation when re-arranging at least some of said plurality of blocks of non-media data.

13. The media playback device of claim 8, further comprising a firmware and wherein said secure media processing environment comprises a trusted media codec implemented in said firmware.

14. The media playback device of claim 13, wherein said secure memory comprises volatile random-access memory accessible via said firmware.

15. The media playback device of claim 8, further comprising a network interface, and wherein said insecure media processing environment is configured to obtain said rights-protected media file portion via said network interface.

16. A non-transitory computer-readable storage medium having stored thereon instructions that, when executed by a processor, configure the processor to perform a method comprising:
  obtaining a rights-protected media file portion;
  performing steps a-d in a secure media processing environment:
    a. generating a clear media file portion by removing rights-protection from said rights-protected media file portion, said clear media file portion comprising a clear meta-data portion and a plurality of blocks of encoded media data arranged in a first arrangement;
    b. temporarily storing said clear media file portion in a secure memory not accessible via said insecure media processing environment;
    c. generating a proxy comprising i) a proxy clear-meta-data portion corresponding substantively and structurally to said clear meta-data portion and ii) a plurality of blocks of non-media data arranged according to said first arrangement such that said proxy corresponds structurally, but not substantively, to said clear media file portion; and
    d. storing said proxy in an insecure memory accessible via said secure media processing environment and an insecure media processing environment;
  while said clear media file portion remains temporarily stored in said secure memory, performing steps e-g in said insecure media processing environment:
    e. accessing said proxy in said insecure memory via an intermediate processing component, said intermediate processing component re-arranging at least some of said plurality of blocks of non-media data into a second arrangement, different from said first arrangement, to form a manipulated proxy in said insecure memory, wherein said intermediate processing component lacks access to said clear media file portion, but wherein said intermediate processing component manipulates said proxy as if it were said clear media file portion; and
  after said manipulated proxy is formed in said insecure memory, performing steps f-h in said secure media processing environment:
    f. accessing said manipulated proxy in said insecure memory and determining said second arrangement of said plurality of blocks of non-media data of said manipulated proxy;
    g. accessing said clear media file portion in said secure memory and re-arranging said plurality of blocks of encoded media data into said second arrangement to form a manipulated clear media file portion that corresponds structurally to said manipulated proxy; and
    h. rendering said manipulated clear media file portion.

17. The computer-readable storage medium of claim 16, wherein said plurality of blocks of non-media data comprises a plurality of references to a plurality of locations within said secure memory in which said clear media file portion is temporarily stored.

18. The computer-readable storage medium of claim 16, the method further comprising:
  in said insecure environment:
    determining a media container format corresponding to said rights-protected media file portion;
    obtaining a media-data proxy specifier in accordance with said media container format; and
    providing said media-data proxy specifier to said secure media processing environment.

19. The computer-readable storage medium of claim 18, wherein said media-data proxy specifier comprises at least one of a white list of block tags to include in said media-data proxy and a black list of block tags to exclude from said media-data proxy.

20. The computer-readable storage medium of claim 18, the method further comprising ensuring that only non-sensitive data is exposed to said insecure media processing environment prior to storing said proxy in said insecure memory.

21. The computer-readable storage medium of claim 18, wherein generating said media-data proxy in said secure media processing environment comprises generating said media-data proxy in accordance with said media-data proxy specifier.

22. The computer-readable storage medium of claim 16, wherein re-arranging at least some of said plurality of blocks of non-media data in said insecure media processing environment comprises at least one of a de-multiplexing operation, a loss mitigation operation, and a frame assembly operation.

* * * * *